R. M. FREEMAN.
SOIL LOOSENING DEVICE.
APPLICATION FILED JULY 29, 1920.
1,386,171.
Patented Aug. 2, 1921.
3 SHEETS—SHEET 1.
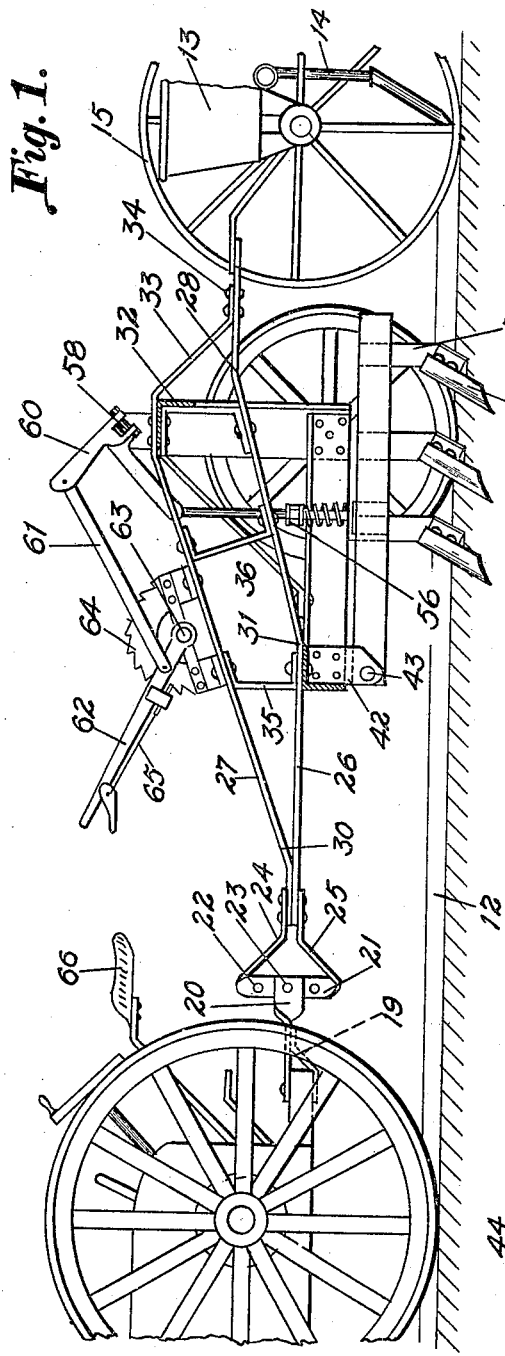
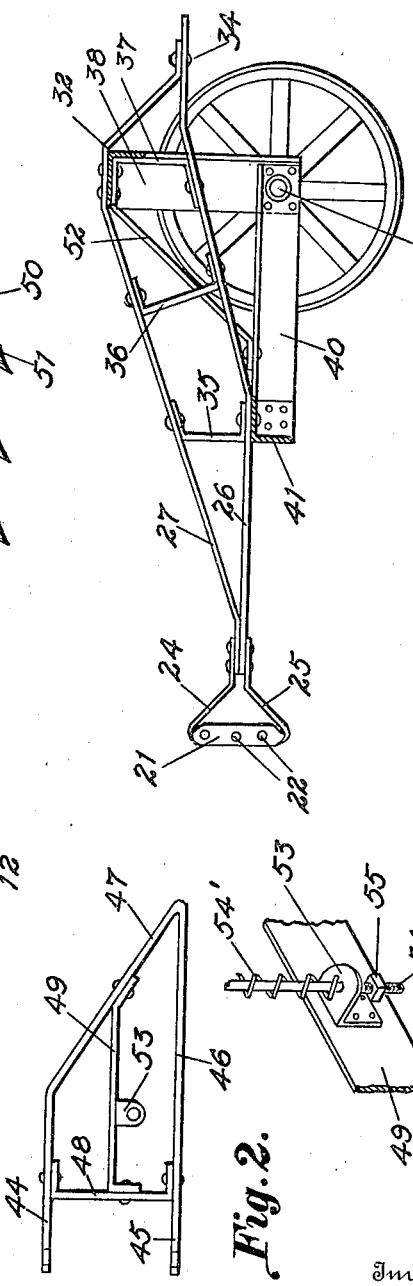
Inventor
R. M. Freeman.
By Arthur H. Sturges.
Attorney
Witness
E. R. Morris

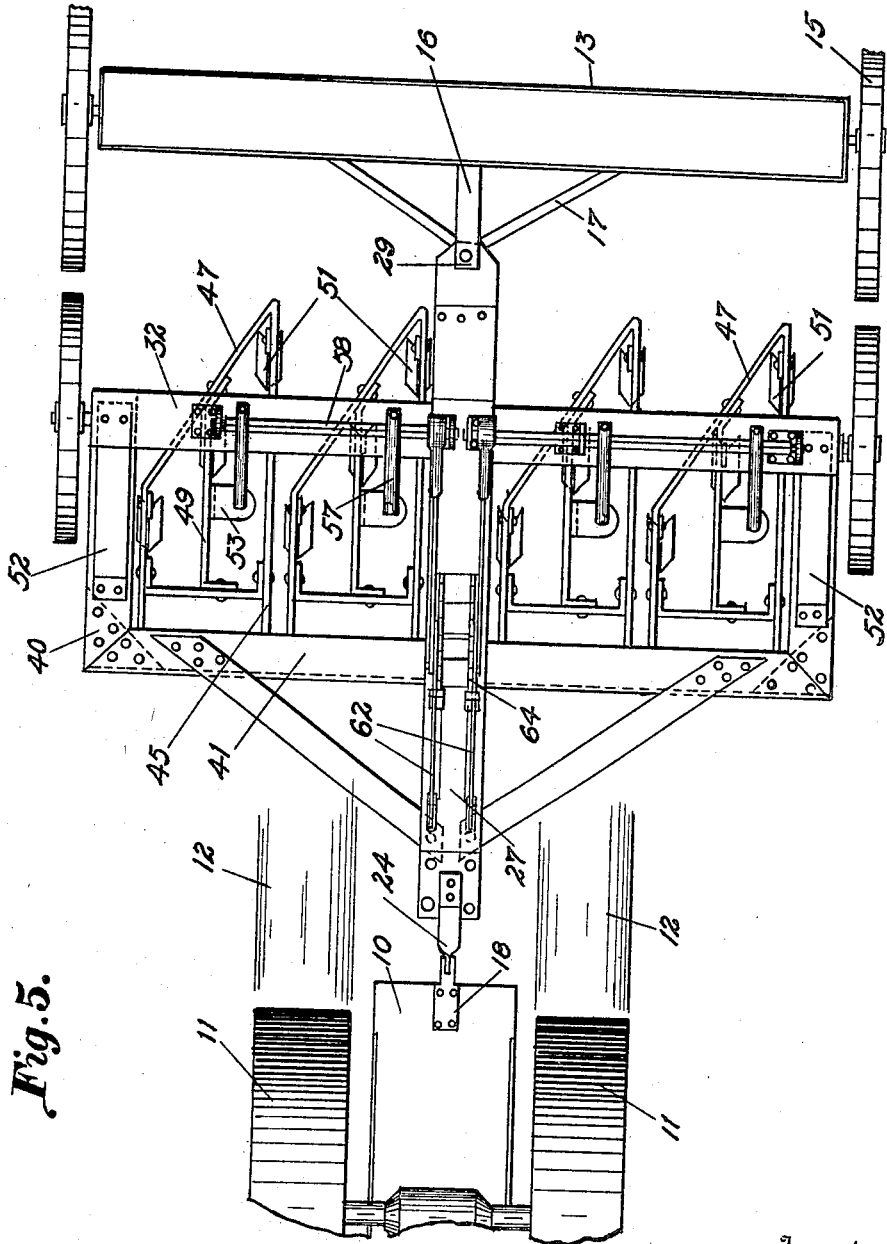

R. M. FREEMAN.
SOIL LOOSENING DEVICE.
APPLICATION FILED JULY 29, 1920.

1,386,171.

Patented Aug. 2, 1921.
3 SHEETS—SHEET 3.

Inventor
R. M. Freeman.
By Arthur H. Sturges.
Attorney

Witness

UNITED STATES PATENT OFFICE.

ROBERT M. FREEMAN, OF FREMONT, NEBRASKA.

SOIL-LOOSENING DEVICE.

1,386,171.     Specification of Letters Patent.     Patented Aug. 2, 1921.

Application filed July 29, 1920. Serial No. 399,786.

*To all whom it may concern:*

Be it known that I, ROBERT M. FREEMAN, a citizen of the United States, residing at Fremont, in the county of Dodge and State of Nebraska, have invented certain new and useful Improvements in Soil-Loosening Devices, of which the following is a specification.

The present invention relates to improvements in devices for loosening soil, and relates more particularly to an improved apparatus adapted to be coupled between a tractor and seed drill for preparing the ground prior to the deposit of the seed.

It is an object of the invention to provide a simple and inexpensive, while light, apparatus which may be conveniently coupled behind a tractor and between the same and the seed drill having points or shovels for digging up the hard ground which has been compressed by the heavy wheels of the tractor.

Another object of the invention resides in providing an improved framework for the device which, while light and simple in design, is yet durable and strong and of such a character that it will impose the weight of the tractor and said drill upon its plows or points.

A still further object of the invention resides in providing adjustable points or plows for the device together with means for bodily raising and lowering the plows into and out of operative position so that their action may be suspended at requisite times, for instance, when going to and from the field of operations.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a view in elevation of the improved device showing also partially the tractor and seed drill.

Fig. 2 is a plan view of one of the plow frames.

Fig. 3 is a fragmentary perspective view of a portion of the plow adjusting device.

Fig. 4 is a central sectional view taken through the improved device.

Fig. 5 is a plan view of the apparatus shown in Fig. 1.

Figure 6:
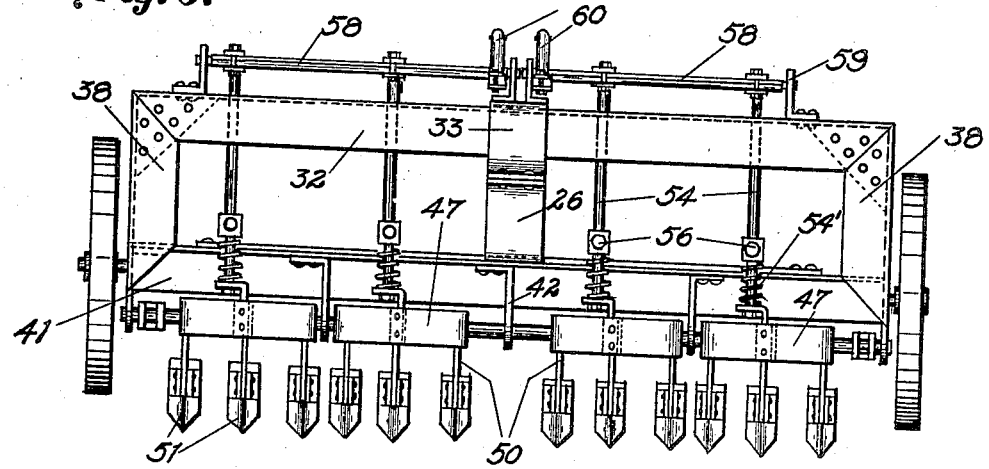
Fig. 6 is a rear view of the device.

Referring more particularly to the drawings, 10 designates the rear platform of a tractor having wheels 11 which form the heavy compressed tracks 12 in the soil, which ordinarily resists the action of the drill tubes and prevents the satisfactory planting of seeds.

The drill is indicated at 13 having the seed tubes 14 and the supporting wheels 15. The drill is also made with a central draw bar 16 and with diagonal braces 17 to support the same.

The improved device is intended to be situated between the tractor and drill, and for this purpose the platform 10 of the tractor is provided with a coupling piece 18 braced by a piece 19 and having its rear portion 20 bent at right angles to the part 18, which is bolted or otherwise secured to the platform 10 of the tractor.

A clevis is carried by the forward part of the improved device and consists of a piece of metal having its intermediate portion arranged to provide a vertically elongated bar 21 having a suitable number of perforations 22 therein. The vertical bar 21 is twisted so that the same fits edgewise into the bifurcated end of the part 21, as seen in Fig. 5.

A bolt or pin 23 is adapted to be passed through the part 20 and through one of the perforations 22 to adjustably couple the device to the tractor. The end portions of the clevis are bent diagonally toward one another, as indicated at 24 and 25, and have their extremities riveted or otherwise secured to the longitudinal beams 26 and 27 of the improved device.

The lower beam 26 is carried rearwardly in a straight line until it arrives at a point 31 where it is bent upwardly and rearwardly in a diagonal fashion until it arrives near the end of the device where it is again bent as at 28 into the horizontal and parallel with the front portion thereof. The idea is to bring the beam 26 at its rear end to a point where it may be engaged beneath the draw bar 16 of the drill, so that it may be coupled thereto as by a pin 29.

The upper beam 27 overlies the under beam 26 and is bent at 30 just rearwardly of its front end so as to form an acute angle with the beam 26. From its point of bending 30 the beam 27 is carried upwardly and rearwardly at a greater inclination than the intermediate part of the lower beam in order that it may pass above a transverse bridge piece 32 of angle iron construction which forms a part of the framework of the device.

The beam 27 is riveted or otherwise secured to the bridge piece 32, and rearwardly thereof is bent sharply downward, as indicated at 33 in order to meet the rear end of the beam 26 to which it is attached by rivets or other fastenings 34. The two beams 26 and 27 therefore form an openwork construction which is strengthened and supported by the truss braces 35, 36, and 37. These braces are made of channel shape in order that their angularly turned ends may be riveted to the beams.

The bridge piece 32 is supported at its ends by vertical standards 38 having their support from stub axles 39 carried by horizontally extending side rails 40. The side rails 40 extend forwardly from the stub axles 39 and are connected by a transverse beam 41.

The parts 40 and 41 are preferably of angle construction and may be suitably braced. A number of hangers 42, preferably five, are employed to support a shaft 43 on which are directly journaled the projecting ends 44 and 45 of the plow frames 46. These latter frames are constructed as more particularly illustrated in Fig. 2 in which the general make-up of the frame is that of a piece of metal bent substantially U-shape with its connecting portion 47 arranged diagonally so that one leg of the frame is longer than the other.

A transverse brace 48 is connected between the longer and shorter legs of the frame near the projecting ends 44 and 45 and a longitudinal brace 49 is coupled between the intermediate part of the brace 48 and the central part of the diagonal connecting portion 47.

Figure 7:
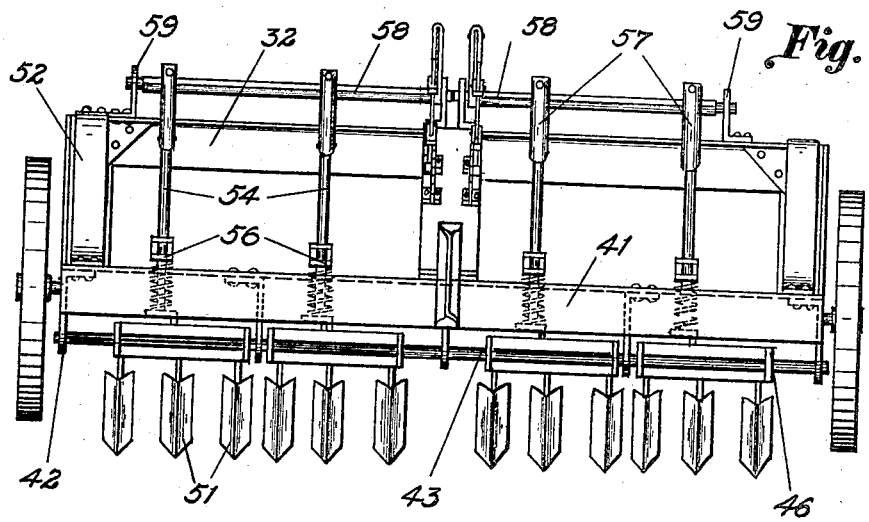
Fig. 7 is a front view thereof.

The frames 46 are preferably four in number, as indicated in Figs. 5 and 7, and the part of the same thus coöperates with the five hangers 42 so that a frame is included between each pair of said hangers, as shown in Fig. 7.

Depending from the frames 46 are stocks 50 which carry the points or plows 51. These plows may be of any suitable construction for loosening the compressed tracks 12 of the soil.

The side rails 40 and the standards 38 are held in their right angular relation by braces 52, the ends of which are downturned so that they may be riveted or otherwise secured to the horizontal flanges of the side rails and the under side of the bridge piece 32.

The frames 46 all carry lugs 53 perforated to receive rods 54 having nuts 55 threaded on the lower portions thereof beneath the lugs and provided with coil springs 54' above the lugs. The upper ends of the coil springs are confined by suitable devices 56. The upper ends of the rods 54 are coupled to links 57 mounted on square shafts 58 journaled in lugs 59 supported on the bridge piece 32. The shafts 58 are preferably two in number so that the frames 46 may be lowered in pairs at opposite sides of the machine independently.

The square shafts 58 receive the bifurcated ends of arms 60 extending forwardly and downwardly where they unite with hand levers 62. The hand levers are pivoted at 63 on toothed segments or racks 64 engaged by the latch devices 65 of the levers 62. The segments 64 are secured to the diagonal portion of the upper beam 27 between the truss braces 35 and 36, and the construction, therefore, is amply strengthened at this point where a great deal of the strain devolves and it also allows the placing of the levers and segments closer to the shafts 58 so that the actuation thereof may be more positive and easy.

Figure 8:
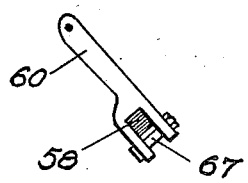
Fig. 8 is a view partially in elevation and section of a detail of the adjusting device.

The levers 62 are disposed in a position convenient for operation by the occupant of the tractor seat 66. As shown more particularly in Fig. 8, the bifurcated portion of the arm 60 is arranged to receive a bolt 67 by which the arm may be prevented from escaping from the shaft 58, while at the same time allowing of the withdrawal of the bolt 67 when occasion requires dismounting of the arm. The structure of the frame is such as to prevent vibration, owing to the reinforcement provided by the truss braces 35, 36 and 37.

In operation, the plows 51 being drawn upon the tractor will dig up the soil which has been compressed by the wheels 11, and will, therefore, prepare the ground for the passage of the seed tubes 14 so that the planting may be done expeditiously and efficaciously. Should obstacles be encountered in the soil which might injure the plows 51, the latter are permitted to yield in order to avoid the obstacles, this action being permitted by the coil springs 54' which will return the plow frames and the lower position yieldingly after the obstacle has been passed.

The levers 62 may be swung rearwardly in order to lift the plow frames 46 to such a degree as will remove the points 51 from the soil altogether. This is advantageous in going to and from the field and in driving the device over roads or in other places where it is desired to suspend its action.

I do not wish to be restricted to the size, form, and proportions of the various parts, and obviously changes could be made in the construction herein described without departing from the spirit of the invention, it being only necessary that such changes fall within the scope of the appended claims.

What is claimed is:

1. A framework for soil looseners comprising a pair of beams secured together at their front and rear ends and being bent apart at their intermediate portions, the rear ends of the beams being higher than their front ends, a bridge-piece extending transversely between the bent-apart beams near their rear ends, a truss brace secured to said beams and bridge piece, said bridge-piece having supporting standards, side rails connected to said standards at their lower ends and extending forwardly therefrom, a cross sill connecting the front ends of the rails, a second truss brace between the beams and connected to said beams and the sill, and an implement holder carried by the framework.

2. A framework for soil looseners and the like comprising a pair of beams extending longitudinally and being bent apart at their intermediate portions, fastenings securing the front and rear ends of the beams together, the rear ends being higher than the front ends, a bridge-piece extending transversely through the space between the beams near their rear ends and supporting the upper beam, a truss-brace having angled ends engaging beneath the bridge-piece and against the upper face of the lower beam, fastenings connecting said angled ends with the bridge-piece and beams, said brige-piece having supporting standards, side rails extending forwardly from the lower ends of the standards, a cross sill connecting the front ends of the rails, and an implement holder carried by the framewrok.

3. A framework for soil looseners and the like comprising a pair of beams lying longitudinally of the framework being secured at their front and rear ends and spaced apart at their central parts, end and intermediate truss braces secured to the beams and lying therebetween, a bridge piece extending transversely between the upper beams and the rear truss brace, said upper beam sloping gradually down in a forward direction and sharply in a rear direction, the rear ends of the beams being higher than their front ends, said bridge piece having standards extending from the ends thereof, side rails extending forwardly from the lower ends of the standards, a cross sill connecting the front ends of the rails and secured to said lower beam and the front truss brace, an implement holder swingingly supported from said side rails, and means on the framework for shifting said holder.

In testimony whereof, I have affixed my signature in presence of two witnesses.

ROBERT M. FREEMAN.

Witnesses:
V. M. HUFFMAN,
O. H. JENKINS.